United States Patent [19]

Colclough et al.

[11] Patent Number: 4,788,016

[45] Date of Patent: Nov. 29, 1988

[54] APPARATUS AND PROCESS FOR PRODUCING POWDERS AND OTHER GRANULAR MATERIALS

[75] Inventors: Michael L. Colclough, Surrey; Timothy J. Noakes, Hampshire, both of England

[73] Assignee: Imperial Chemical Industries PLC, London, England

[21] Appl. No.: 62,653

[22] Filed: Jun. 16, 1987

[30] Foreign Application Priority Data

Jun. 16, 1986 [GB] United Kingdom ............... 8614566

[51] Int. Cl.[4] .............................. B29B 9/00; B05B 5/02
[52] U.S. Cl. ........................................... 264/10; 239/3; 239/690; 425/6
[58] Field of Search ................ 239/690, 690.1, 3, 696, 239/705, 706, 708; 264/10, 12; 427/30; 118/626; 425/6

[56] References Cited

U.S. PATENT DOCUMENTS 4,148,932 4/1979 Tada et al. .................... 427/31 X

FOREIGN PATENT DOCUMENTS 1156008 11/1983 Canada .................................. 264/10

Primary Examiner—Evan Lawrence
Attorney, Agent, or Firm—Cushman, Darby & Cushman

[57] ABSTRACT

Electrostatic spraying apparatus and process for spraying liquids which form a coalescent resistant surface in flight in a particular environment to produce a powder or granular material. The process involves delivering a liquid to a spraying site of an electrostatic spray head; making contact with the liquid via an electrically conducting or semiconducting liquid contacting surface; charging the liquid contacting surface to a high voltage of one polarity relative to a reference surface to intensify the electric field strength at the spraying site sufficiently that the liquid at the spraying site is drawn out preponderantly by electrostatic forces into at least one cone from which a corresponding ligament issues and breaks up into a spray of electrostatically charged droplets; providing the environment in a space sufficient that droplets from the spray head form, in flight, particles having a substantially coalescent resistant surface; and collecting the particles so formed.

24 Claims, 4 Drawing Sheets

APPARATUS AND PROCESS FOR PRODUCING POWDERS AND OTHER GRANULAR MATERIALS

FIELD OF THE INVENTION

This invention relates to apparatus and a process for producing powders and other granular materials.

BACKGROUND OF THE INVENTION

Powders are usually manufactured by grinding larger stock of the same material. One example is the manufacture of powder for use in producing a protective and decorative coating. In use the powder is first electrostatically sprayed onto the article to be coated. The temperature of the article is then raised in an oven to stove the powder which flows out into a more or less continuous coating akin to a coat of paint.

Powder for such use is manufactured by extruding the material in a large section to form an extruded solid stock. The solid stock is then kibbled into small pieces which are then ground into a powder.

The grinding process produces a wide range of particle sizes in the powder. Such a wide range would produce a very uneven coating and would make it impossible to produce a thin coating. To ameliorate that problem somewhat, the particles are graded to select a more uniform particle size. However, the problem remains that the particle size is rather too great easily to produce a high standard of finish suitable, for example, for motor cars.

One of the problems of kibbling and grinding is that the melting point of the material being processed must be high enough that the material is not melted during the kibbling and grinding process. Another problem in the known process for manufacturing powders is that producing stock by extrusion makes it uneconomic to produce small quantities of powder. A usual batch would be of the order of half a ton. Further, the extrusion, kibbling and grinding machinery is all large and expensive.

SUMMARY OF THE INVENTION

In accordance with the invention there is provided apparatus for manufacturing powders or granular materials from liquids capable of quickly forming a coalescent resistant surface in a particular environment, comprising: an electrostatic spray head having a spraying site, an electrically conducting or semiconducting liquid contacting surface and means for delivering the said liquid to the spraying site; high voltage supply means for charging the liquid contacting surface to a high voltage of one polarity relative to a reference surface, said voltage being sufficiently high and in combination the spraying site being sufficiently sharp, as to intensify the electric field strength at the spraying site sufficiently when covered, in use, by the liquid to be sprayed, that the liquid at the spraying site is drawn out preponderantly by electrostatic forces into at least one cone from which a corresponding ligament issues and breaks up into electrostatically charged droplets; means for providing said environment in a space sufficient that droplets from the spray head form, in flight, particles having a substantially coalescent resistant surface; and means for collecting the particles so formed.

In accordance with the invention there is also provided a process for manufacturing powders or granular materials from liquids capable of forming a coalescent resistant surface in a particular environment, comprising: delivering said liquid to a spraying site of an electrostatic spray head; making electrical contact with said liquid via an electrically conducting or semiconducting liquid contacting surface; charging the liquid contacting surface to a high voltage of one polarity relative to a reference surface, to intensify the electric field strength at the spraying site sufficiently that the liquid at the spraying site is drawn out preponderantly by electrostatic forces into at least one cone from which a corresponding ligament issues and breaks up into electrostatically charged droplets; providing said environment in a space sufficient that droplets from the spray head form, in flight, particles having a substantially coalescent resistant surface; and collecting the particles so formed.

It has been found that if variables such as flow rate, the high voltage, the viscosity and resistivity of the liquid are all controlled, the size of the droplets into which the ligaments separate is closely similar. In some cases it may be desired to use a hot liquid produced by, say, a traditional extrusion process, before it solidifies, so that it solidifies in flight. Although this does not remove the need for an extruder, the heavy machinery of the kibbler and grinder are removed. Removal of the need for a kibbler and a grinder allows the melting point of the material to be lower. In the example given of manufacturing powder for protective and/or decorative finishes, the stoving temperature can thus be lower, producing a saving in energy costs.

In other cases liquid will form a coalescent resistant surface by other means for example by evaporation of solvent and/or by curing. By "coalescent resistant surface", we mean that the particles do not stick inseparably together since if that were the case, the product would not be, or would not produce, a powder or granular material. The apparatus is then even more simple and inexpensive compared with that for the traditional manufacturing of powder, since there is no requirement for an extruder. The apparatus may be suitable for small batches of a powder or granular material of one particular colour.

The particles produced are closely similar in size. The size may be controlled from very fine, say of the order of microns, to coarse of the order of hundreds of microns or, indeed, may be so large as to produce a granular material rather than a powder.

One of the factors which affects whether a powder or granular material can be formed with particular liquids, is the flight time of the droplets/particles. The flight time can be increased by discharging the droplets so that they loose their attraction to earth or opposite polarity objects.

A preferred feature of the invention has means for discharging the spray in the form of one or more sharp discharge electrodes, wherein the high voltage supply means is arranged to charge the sharp electrode or electrodes to a high potential of the opposite polarity relative to the field adjusting electrode, such as to produce a corona to discharge the spray, the field adjusting electrode being positioned between the spraying site and the discharge electrode or electrodes, and having an orifice through which the spray is directed, the field adjusting electrode being of sufficiently large overall dimensions and having a sufficiently small orifice to shield the spraying site and the cone or cones of liquid from the corona.

BRIEF DESCRIPTION OF THE DRAWINGS

Embodiments of the invention will now be described with reference to the accompanying drawings, in which.

DETAILED DESCRIPTION

Figure 1:
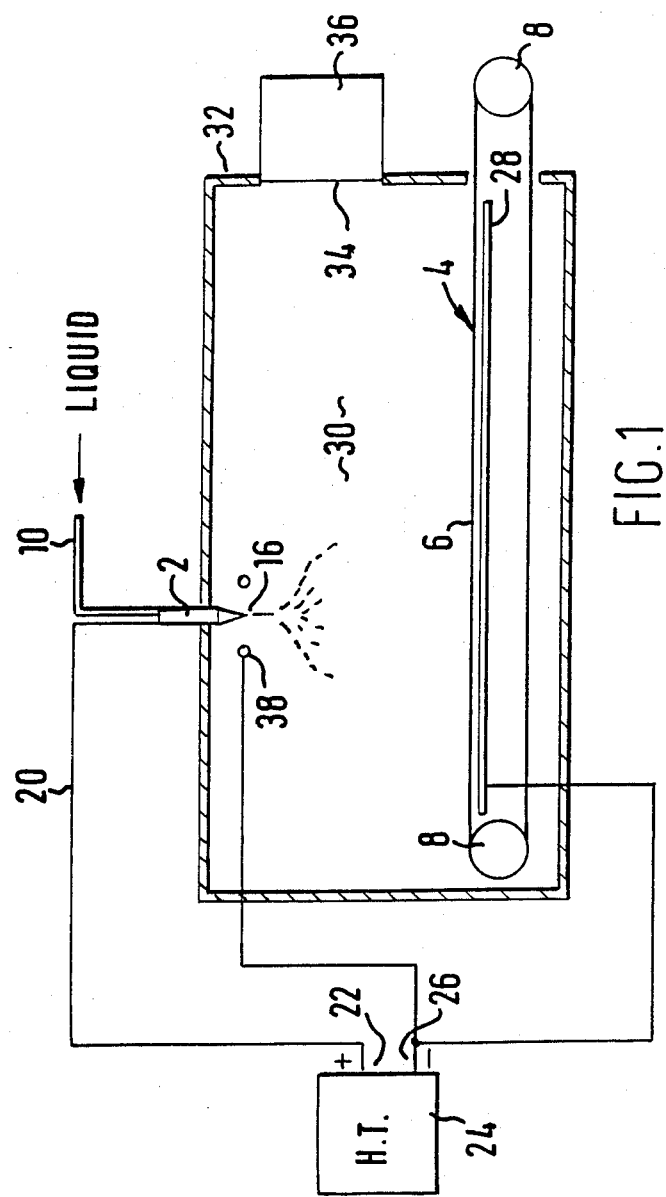
FIG. 1 is a schematic cross-section through apparatus embodying the invention for making powders or granular materials.

Referring to FIG. 1, the apparatus has an electrostatic spray head 2. The spray head is shown in more detailed cross section in FIG. 3. The spray head is linear, having a generally constant cross section. The spray head is made largely of insulating material. Liquid to be sprayed is supplied via one or more channels 10 to a gallery 12. The liquid may be clear or may contain pigment or other matter. The gallery 12 distributes liquid to a slot 14 communicating with the centre of a spraying site in the form of an edge 16. Although the slot, naturally, has two sides, the electrostatic effect is that of one edge. That is to say only one set of ligaments is formed centrally. If the effect were that of two edges, ligaments would be produced off the "edges" at both sides of the slot, this concept of one edge fed by a central slot may, perhaps, be better understood by considering that the liquid to be sprayed has significant conductivity and will, in use, bridge the slot.

Near the exit from the slot 14 at the spraying edge 16, is positioned a strip of conducting or semiconducting material 18, over the surface of which the liquid passes on its way to the spraying edge 16.

The conducting or semiconducting surface 18 is connected via a high voltage supply lead 20, to one of the high voltage output terminals 22 of a high voltage generator 24. Another output terminal 26 of the high voltage generator is connected to a reference surface.

In use the electric field is defined between the reference surface and the liquid arriving at the edge 16. The edge 16 is sharp to a degree sufficient, in combination with the voltage produced by the high voltage generator, to define an intense electric field. Assuming the surface 18 has a positive potential relative to the reference surface, negative charge is conducted away from the liquid at its contact with the conducting or semiconducting surface, leaving a net positive charge on the liquid. The electric field at the liquid /air boundary at the edge 16 is sufficiently intense that the liquid is drawn out into ligaments spaced along the edge 16.

The liquid becomes positively charged, negative charge being conducted away by the conducting surface 18, leaving a net positive charge on the liquid. The charge on the liquid produces internal repulsive electrostatic forces which overcomes the surface tension of the liquid, forming cones of liquid at spaced intervals along the edge 16. From the tip of each cone a ligament issues. At a distance from the edge 16, mechanical forces produced by travelling through the air cause it to break up into charged droplets of closely similar size. The number of ligaments, which is formed depends on the flow rate of the liquid and on the electric field intensity, amongst other factors such as the resistivity and the viscosity of the liquid. All other things being constant, controlling the voltage and the flow rate, controls the number of ligaments, which enables the droplet size to be controlled and very closely similar, say 40 to 50 microns.

We find it necessary to dimension the spacing of the edge 16 from the conducting or semiconducting surface 18 suitably, in relation to the resistivity of the liquid being sprayed. We find that spraying will not take place if, given a spacing, the resistivity of the liquid is too high or, conversely, given a particular resistivity, the spacing is too great. A possible explanation for this observation is that in addition to the liquid becoming charged as it passes over the conducting or semiconducting surface, there is also conduction of charge away from the liquid at the edge 16 through the liquid. The resistance of this path must not be so high that the voltage drop across it results in the voltage at the edge 16 being too low to produce an atomising field strength. The distance between the edge 16 and the conducting or semiconducting surface 18 must therefore be sufficiently small to allow for the resistivity of the liquid being used. We have found that a suitable position can be found for the surface even when spraying, say, a liquid having a resistivity in the range $10^6$ to $10^{10}$ ohm cm.

The spray head 2 is directed into a chamber 30. Means is provided in the form of a source of ultra violet radiation 36, to treat the droplets in flight. The source 36 illuminates the droplets through a quartz window 34.

Other forms of treatment may be used. For example, the source 36 may be replaced with a source of other electromagnetic radiation or with a means of mixing a gas or vapour catalyst with the droplets in flight.

The chamber provides sufficient space and the environment therein is suitable for the liquid droplets to form a coalescent resistant surface in flight. That is to say, since we are interested in making a powder or granular material, the droplets must form particles which do not stick together inseparably. Otherwise the product would not be a powder or granular material. In some cases it is envisaged that the particles might stick together to an extent, but to form a powder or granular material they would need to be separable by some means or other.

Means is provided in the form of a conveyor 6 to collect the powder or granular material. The reference surface in this case may be a conducting surface 28 situated in contact with and under the top flight of the conveyor 6. In use a high potential difference is maintained between the liquid contacting surface 18 and the reference surface 28. The surface 28 ensures that the charged particles deposit on the conveyor. The conveyor is sufficiently conducting to allow the charge of the powder or granular material to leak away to the conducting surface 28. Otherwise charge could build up on the conveyor preventing deposit of further powder or granular material. In an alternative, the conveyor may itself be sufficiently conducting to be connected to the output of the high voltage generator.

In the present example, the liquid comprised a mixture of N-viny pyrolidone 88%, benzophenone 4%, irgacure 184 4% and dimetylethanolamine 4%. The mixture is found to cure quickly to form a dry surface when exposed to ultraviolet radiation. To provide the correct environment, the walls 32 of the chamber 30 include a quartz window 34. The source 36 of ultra violet radiation is arranged to illuminate the inside of the chamber 30 through the window 34. If the liquid being sprayed produces a coalescent resistant surface very fast, e.g. cures very fast, it may be necessary to shield the ligaments from exposure to the ultraviolet.

In other examples, with other liquids the ultraviolet source may be replaced with any suitable electromagnetic radiation source.e.g. visible light, infra red, micro wave, radio frequency etc.

Figure 3:
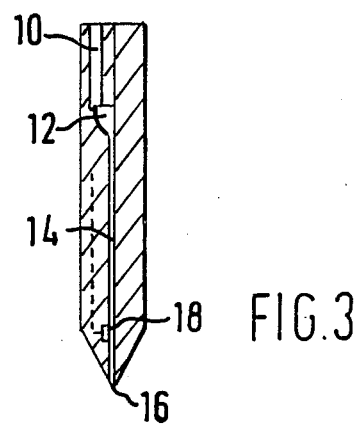

Although only one spray head is illustrated, clearly a plurality could be used in the same chamber. Further the configuration of the spray head could be other than linear. For example, if very low outputs were required for some special use, the spray head could comprise an arrangement to produce a single ligament such as a single conducting capillary tube. An alternative form to give a higher output is an annular spray head in which, say, FIG. 3 is a section through one side of an annular ring.

In order to reduce the voltage required to produce electrostatic spraying, the reference surface may include a field adjusting electrode 38 positioned near the spray head. The electrode may be at the same potential as the surface 28, as illustrated, or at some intermediate potential. As the field adjusting electrode is much closer to the spray head than is the surface 28, it requires a much lower potential difference between them to produce an electric field strength to induce electrostatic spraying. A position, generally behind or level with the spraying edge 16, can be found at which virtually none of the liquid being sprayed deposits on it. Almost all the spray deposits as surface dry particles on the conveyor 6 under the influence of the field between the spray head and the surface 28 of the conveyor. In the case of a linear spray head, the electrode 38 would extend along both sides of and parallel to the spraying edge 16. In the case of a single capillary tube or annular spray head, the electrode 38 would be a ring surrounding the spray head.

One of the features of charged droplets produced by electrostatic spraying, is that they are highly mobile towards any surface of opposite charge or at ground potential. This feature is used in the above apparatus to ensure that the powder or granular material deposits on the conveyor 28. The high mobility does introduce a problem, however. In particular it reduces the flight time of the droplets before, as particles having a coalescent resistant surface, they reach the conveyor.

Figure 2:
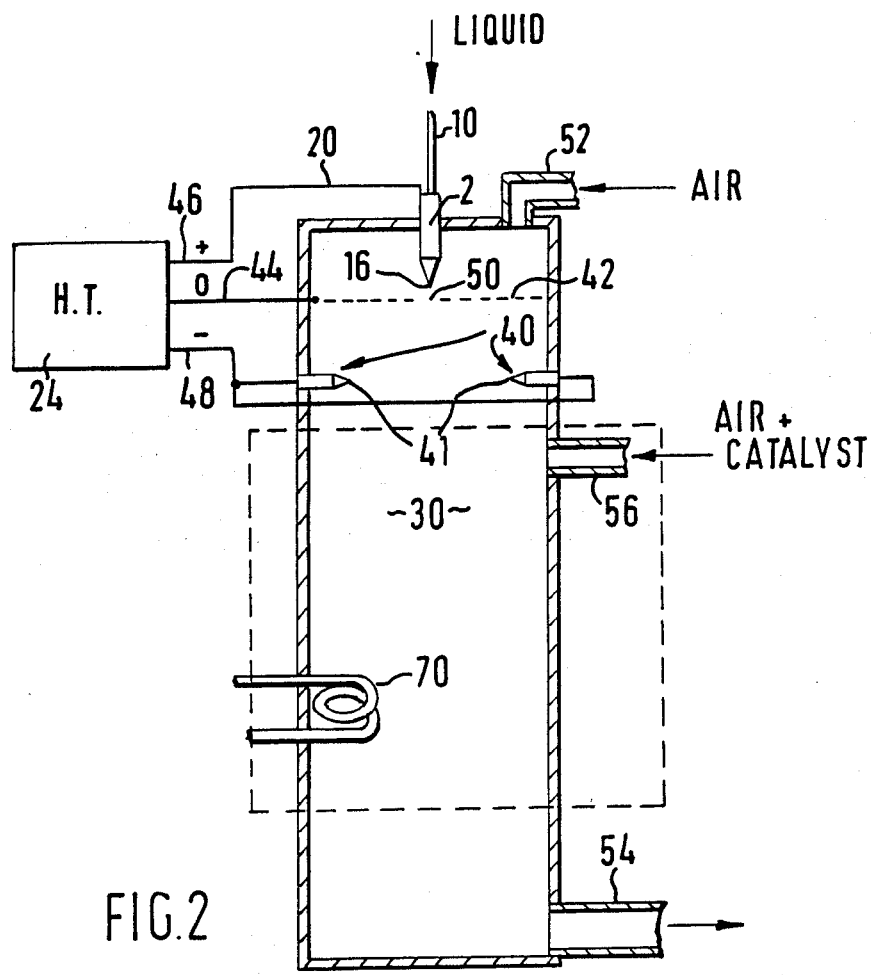
FIG. 2 is a schematic cross-section through an alternative apparatus embodying the invention for manufacturing powders or granular materials.
Figure 4:
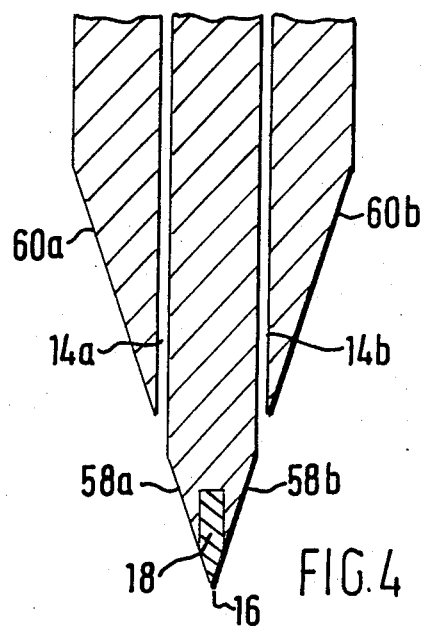
FIGS. 3, 4 and 5 are schematic cross-sections through alternative spray heads which can be used in the apparatus of FIG. 1 or of FIG. 2.
Figure 5:
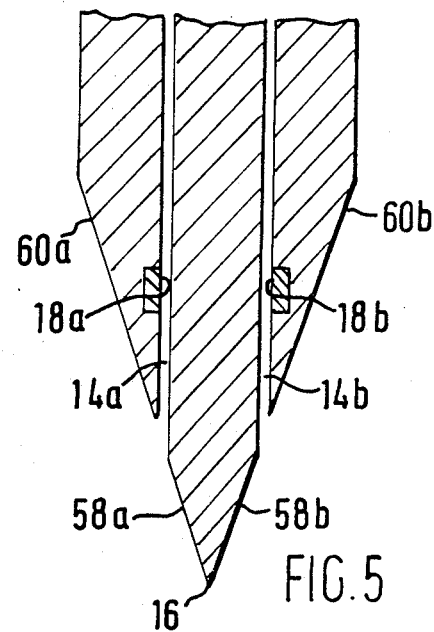

The apparatus illustrated in FIG. 2 is intended to increase the flight time.

The apparatus is in the form of a tower. The spray head 2 is positioned at the top of the tower. Spaced from and down stream of the spray head are two sharp discharge electrodes 40. The discharge electrodes are placed out of the flight path of the droplets but are directed inwardly towards the flight path. In the case where the spray head is linear, the discharge electrodes may also be linear, extending perpendicular to the plane of the paper, and having a sharp serrated edge 41. There may be circumstances where a suitably positioned single electrode would suffice. The reference surface is now in the form of a shield electrode 42 positioned between the spray head and the discharge electrode. The high voltage generator 24 has a reference output 44 connected to the shield electrode 42. The spray head (that is to say the liquid contacting surface of the spray head) is connected to a high voltage output 46 from the generator 24 of one polarity relative to the shield electrode 42. The discharge electrode 40 is connected to a high voltage output 48 from the generator, of the other polarity relative to the shield electrode. Thus the output 46 could be positive relative to the shield electrode 44, whilst the output 48 is negative.

One of the functions of the shield electrode 42 is to define with the spraying site in the form of the sharp spraying edge, a sufficient electric field strength to induce electrostatic spraying from the spray head 2.

The shield electrode 42 has an orifice 50 aligned with the spray head 2 and sufficiently large that the ligaments or the droplets pass through, dependent on whether the ligaments break up before or after the shield electrode, to produce a spray of droplets beyond the shield. If the orifice were too small the droplets or ligament would deposit on the shield electrode 42. A small orifice is required in the present apparatus for reasons explained below.

In order to prolong their flight time the droplets which issue through the orifice 14 are discharged. This is effected by the discharge electrode 40. In the embodiment illustrated, the discharge electrode is directly in the path of the spray. The discharge electrode 40 is driven to a sufficiently high voltage relative to the shield electrode 42 as to produce a corona discharge. The negative ions so produced, discharge droplets in the spray issuing through the orifice 50.

The distinction between charged droplets and discharged droplets is very obvious visually. Any droplets remaining charged in the spray are highly mobile in a predictable path. Discharged particles appear as a cloud or smoke which drifts unpredictably in any slight air currents.

If a FIG. 1 field intensifying electrode were used in the place of the present shield electrode, there would be considerable difficulty in discharging all the droplets in the spray. Why this should be so can be understood by considering what happens as the voltage on the discharge electrode is increased from a voltage insufficient to cause ionic discharge.

The or each ligament breaks up into droplets which separate into a spray bounded approximately by a cone. Within the spray, the charged droplets are highly mobile in predictable paths generally towards earth or a surface of opposite polarity. At a threshold, the voltage is sufficiently high that the electric field strength around the sharp tip of the discharge electrode ionises the surrounding air leaving free negative ions. These discharge surrounding droplets in an area around the tip of the discharge electrode. The discharged droplets are easily identifiable visually. They loose their predictable mobility, becoming a drifting smoke which is very distinct from the charged droplets. As the voltage is increased droplets are discharged further from the discharge electrode, so that more of the spray is discharged. When the voltage applied to the electrode is sufficiently high that the boundary of the discharged droplets reaches the edge of the spray cone, the spray would be completely discharged. Unfortunately, at this point the corona uncontrollably jumps to the cone at the base of the ligament or to the spraying edge 16 itself, which discharges the cone. Since it was the charge on the liquid which overcame the surface tension thereof to form the cone and repel the ligament therefrom, discharging the cone destroys the spray.

The shield electrode 42 is arranged to shield the spraying edge 16 and the cone of liquid from the corona thus enabling all the droplets in the spray to be discharged without danger of the cone being discharged. To achieve this, the orifice 50 must not be too large otherwise corona will find its way through. As mentioned above, the orifice must not be too small either, otherwise the droplets will not spray through the orifice but will deposit on the shield electrode. We have found it entirely possible to balance these conflicting requirements so that the orifice can be at the same time neither too large or too small. Complete discharge of the spray can be assured by adjusting the position of the discharge electrode 40 and the voltage applied thereto.

The overall dimensions of the shield electrode must be sufficient to prevent corona reaching the cone of liquid at the base of each ligament or the spraying edge, round the outside of the electrode.

The shield electrode 42 may be metallic but need not necessarily be such a good conductor as that. What is required is that the shield electrode should be sufficiently conducting to remove any charge which may accumulate due to the ionic discharge.

The discharged droplets will slowly settle downwards in the tower at a rate dependent on their size and density and any air movements in the tower. The time taken to descend the tower will depend on the height thereof. The descent can be speeded up if necessary by introducing a flow of air or other gas or vapour via an inlet 52 at the top of the tower. The descent could be slowed by passing a stream of air or other gas or vapour up the tower. To this end, the shield electrode is shown perforated or could be made of gauze.

The powder or granular material is collected at the bottom of the tower and extracted via an outlet 54.

The chamber 30 in which the liquid droplets are provided the space and the environment to form a coalescent resistant surface, may as in FIG. 1, be provided with a quartz window and illumination by ultraviolet or other electromagnetic radiation. In this case, the shield electrode can also be arranged to shield the ligaments from exposure to the radiation, so assisting to ensure that the ligaments do not themselves start to form a coalescent resistant surface which would prevent them from breaking up into droplets. In an alternative form illustrated, a gas or vapour catalyst is introduced into the chamber 30 via an inlet 56.

The shield electrode and the air flow from the inlet 52, together cooperate to prevent the catalyst from reaching the ligaments before they break up into droplets and pass through the orifice 50.

An example of a chemical system suitable for this arrangement is a liquid epoxide sprayed from the spray head and air with a trace of $BF_3$ vapour introduced at the inlet 56. Examples of alternative catalysts in different systems are sulphur dioxide, oxygen, water vapour. Liquids which cure when catalyzed by water vapour include ketamines. In cases where atmospheric oxygen would act as an inhibitor, the air could be replaced by, say, nitrogen.

In an alternative, the liquid supplied to the spray head 2 is a hot molten plastics material produced conventionally by an extruder. The melting point of the material may be low, say, 90 degrees centigrade, since the powder manufacturing process does not involve kibbling or grinding. For the purposes of a decorative and/or protective coating, the material may cure at a temperature of say 140 degrees centigrade. The space 30, in which the liquid droplets are intended to form a coalescent resistant surface, is maintained at a temperature below the melting point, suitable for the surface of the droplets to solidify. To this end a heat exchanger 70 is provided. To cool the space 30 a coolant is circulated through the heat exchanger. In order to prevent premature solidification of the ligaments before droplets have been formed, the environment above the shield electrode may be different from that below. In the present example, the environment above the shield electrode may be hotter then the cooled space 30 below.

In another alternative, the liquid is solvent based and forms a coalescent resistant surface by evaporation of the solvent. This can happen very rapidly from fine droplets. In this example the space requires means for extracting the solvent otherwise the atmosphere in the space will become saturated preventing further evaporation of the solvent. Some form of temperature control may also be needed to encourage evaporation. A hot fluid may in this case be circulated through the heat exchanger 70. It may be preferable not to pass a stream of air by the ligaments. Rapid evaporation from the ligaments may cause solidification of the ligaments preventing formation of the droplets. Indeed, the environment above the shield electrode may be maintained saturated in solvent vapour to discourage evaporation from the ligaments.

In yet another alternative, the liquid sprayed is a mixture of two components which cures rapidly after mixing. One of the problems with such a system, is that if the mixture cures rapidly enough to cure in flight, its pot life will be too short to enable it to be used normally. This problem can be overcome by use of the spray heads illustrated in cross-section in FIGS. 4 and 5. As shown in FIG. 5, the spray head has two slots **14*a* and 14*b*, one for each of the liquid components. The exits of the slots 14*a* and 14*b* lie parallel to but spaced from the spraying edge 16. The liquid component in each slot 14*a* and 14*b* passes over the surface 18*a* or 18*b* of a conducting or semiconducting strip which is connected to the output of the high voltage generator 24. The two liquid components leave the slots 14*a* and 14*b* and pass over exterior surfaces 58*a* and 58*b*** where the components remain separated. The components only meet at the spraying edge where the cones and ligaments which form contain both components. Although in the ligaments the components may not mix particularly well, when a droplet separates from a ligament it is thought to undergo several violent oscillations which mix the components. Whatever the explanation, the components are well enough mixed in the droplets to effect a cure.

An example of a suitable two component liquid system is based on a multi-functional isocyanate component (for example Desmodur N) and a multi-functional amine (for example Versamid).

The spray head illustrated in FIG. 4 has its liquid contacting conducting or semiconducting surface at the edge 16. That is to say the edge 16 is formed in the conducting or semiconducting material.

In other alternatives, three or more component liquids may be used, each liquid being fed to a common spraying edge, but only meeting the other components on the exterior of the spray head. Thus a central slot in the spraying edge, as in FIG. 3, could supply a third liquid component. Further liquid components could be provided via further slots over exterior surfaces **60*a* and 60*b* in FIGS. 4 and 5**.

The quality of the spray and the uniformity of the droplet size is sensitive to two factors amongst others.

When the spraying edge 16 is plain, at any given flow rate, the number of ligaments formed depends on the field strength at the edge. Increasing the field strength increases the number of ligaments. Increasing the number of ligaments at the same overall flow rate, has the effect that each ligament is finer so that the droplets it breaks up into are smaller.

The use of a stream of air or gas past the spray head is prone to disturbing or destroying the ligaments on which the uniform droplet size relies.

Figure 6:
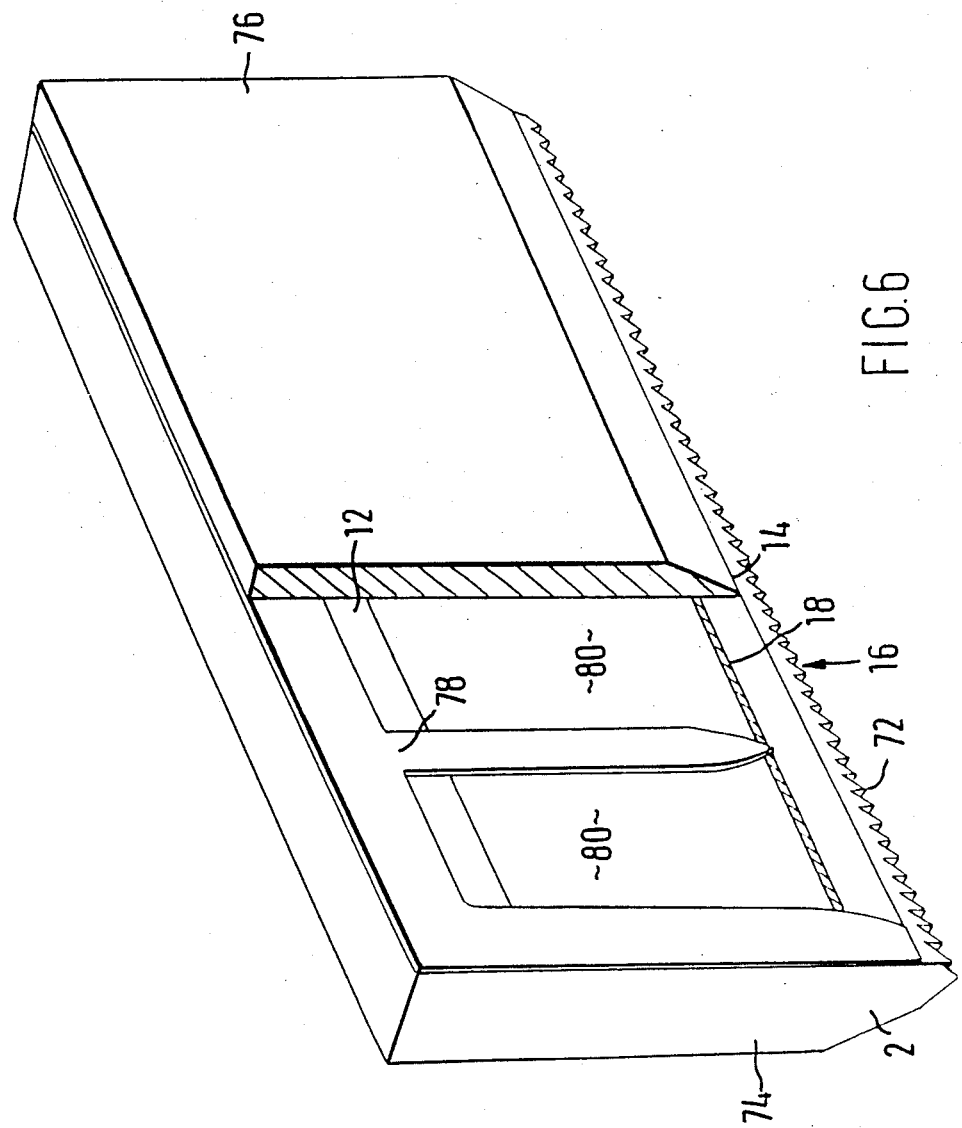
FIG. 6 is a perspective view of a further alternative spray head which can be used with the apparatus of FIG. 1 or of FIG. 2.

The sensitivity to these two factors may be reduced by use of a spray head having a spraying edge 16 formed with spaced tips as shown in FIG. 6. The tips are provided in the example illustrated by teeth 72. The teeth 72 are formed in a body member 74 of insulating plastics material. Liquid to be sprayed is provided via an inlet (not illustrated) to a liquid distribution gallery 12 in the body 74. A closing plate 76 is spaced from and sealed to the body member 74 by a gasket 78. The gasket is open sided adjacent the teeth 72 defining a linear slot 14 between the body member 72 and the closing plate 76. The gasket is so shaped as to provide channels 80 to supply liquid from the distribution gallery 12 to the slot 14. Upstream from the mouth of the slot 14, a conducting or semiconducting strip 18 is inset into the body member 42 to provide a liquid contacting surface. The strip 18 is connected to the high voltage output of a high voltage supply (not shown in FIG. 6) to charge the liquid so that spraying takes place. In use the electric field strength at the tip of each tooth 72 is sufficient to produce a ligament, but the field strength between the teeth 72 is not sufficient to produce a ligament. This condition pertains over a wide range of voltages supplied by the high voltage generator, reducing the sensitivity of the droplet size to variations in voltage.

Because each ligament is located at a particular physical point: the tip of a tooth, it is much less prone to disturbance by an air or gas stream passing the sprayhead.

What is claimed is:

1. Apparatus for manufacturing powders or granular materials from liquids capable of quickly forming a coalescent resistant surface in a particular environment, comprising: an electrostatic spray head having a spraying site, an electrically conducting or semiconducting liquid contacting surface and means for delivering the said liquid to the spraying site a reference surface external to the sprayhead; high voltage supply means for charging the liquid contacting surface to said high voltage of one polarity relative to a reference surface, said voltage being sufficiently high and in combination the spraying site being sufficiently sharp, as to intensify the electric field strength at the spraying site sufficiently when covered, in use, by the liquid to be sprayed, that the liquid at the spraying site is drawn out preponderantly by electrostatic forces into a spray of at least one cone from which a corresponding ligament issues and breaks up into electrostatically charged droplets; means for providing said environment in a space sufficient that droplets from the spray head form, in flight, particles having a substantially coalescent resistant surface; and means for collecting the particles so formed.

2. Apparatus as claimed in claim 1, wherein the spraying site includes a plurality of tips spaced along a spraying edge, the tips being so shaped that, in use, when covered by the liquid to be sprayed, the electrostatic field strength is intensified sufficiently, at the voltage produced by the high voltage supply means, that liquid only at the tips is drawn out into the ligaments.

3. Apparatus as claimed in claim 1 or 2, wherein the means for collecting comprises a conveyor which also provides the reference surface.

4. Apparatus as claimed in claim 1 or 2, further including means for discharging the spray.

5. Apparatus as claimed in claim 1, 2 or 4, wherein the reference surface comprises a field adjusting electrode spaced from the spraying site.

6. Apparatus as claimed in claim 5 wherein the means for discharging the spray comprises one or more sharp discharge electrodes, wherein the high voltage supply means is arranged to charge the sharp electrode or electrodes to a high potential of the other polarity relative to the field adjusting electrode, such as to produce a corona to discharge the spray, the field adjusting electrode being positioned between the spraying site and the discharge electrode or electrodes, and having an orifice through which the spray is directed, the field adjusting electrode being of sufficiently large overall dimensions and having a sufficiently small orifice to shield the spraying site and the cone or cones of liquid from the corona.

7. Apparatus as claimed in claim 6, further including means for introducing a stream of air or gas past the spray head.

8. Apparatus as claimed in claim 7, wherein the field adjusting electrode is gauze or is perforated to allow the air stream through.

9. Apparatus as claimed in claim 1, wherein the means for providing said environment includes means for introducing a gas or vapour drying or curing agent into the said space.

10. Apparatus as claimed in claim 1, wherein the means for providing the said environment includes means for exposing the droplets to electromagnetic radiation.

11. Apparatus as claimed in claim 1, wherein the spray head includes means for providing two liquids to the spraying site so that the or each ligament contains both liquids.

12. Apparatus as claimed in claim 1, wherein the means for providing the said environment includes means for elevating the temperature of the said space.

13. Apparatus as claimed in claim 1, further including means for supplying the liquid at elevated temperature, and wherein the means for providing said environment includes means for cooling the said space.

14. A process for manufacturing powders or granular materials from liquids capable of forming a coalescent resistant surface in a particular environment, comprising: delivering said liquid to a spraying site of an electrostatic spray head; making electrical contact with said liquid via an electrically conducting or semiconducting liquid contacting surface; charging the liquid contacting surface to a high voltage of one polarity relative to a reference surface, to intensify the electric field strength at the spraying site sufficiently that the liquid at the spraying site is drawn out preponderantly by electrostatic forces into at least one cone from which a corresponding ligament issues and breaks up into a spray of electrostatically charged droplets; providing said environment in a space sufficient that droplets from the spray head form, in flight, particles having a substantially coalescent resistant surface; and collecting the particles so formed.

15. A process as claimed in claim 14, including discharging the spray.

16. A process as claimed in claim 15, wherein the spray is discharged by corona, of polarity opposite that of the droplets, produced by one or more sharp electrodes charged to a high voltage, and wherein the spraying site and the cones of liquid are shielded from discharge by a shield electrode at an intermediate voltage, though a hole in which the spray issues.

17. A process as claimed in claim 16, in which the environment above the shield electrode is controlled to discourage formation of a coalescent resistant surface by the ligaments.

18. A process as claimed in any of claims 14 to 17, wherein the reference surface comprises a field adjusting electrode spaced from the spraying site.

19. A process as claimed in any of claims 14 to 17, further including means for introducing a stream of air or gas past the spray head.

20. A process as claimed in any of claims 14 to 17, wherein providing said environment includes introducing a gas or vapour drying or curing agent into the said space.

21. A process as claimed in any of claims 14 to 17, wherein providing the said environment includes exposing the droplets to electromagnetic radiation.

22. A process as claimed in any of claims 14 to 17, including providing two liquids separately to the spraying site so that the or each ligament contains both liquids.

23. A process as claimed in any of claims 14 to 17, wherein providing the said environment includes elevating the temperature of the said space.

24. A process as claimed in any of claims 14 to 17, including supplying the liquid at elevated temperature, and wherein providing said environment includes means for cooling the said space.

* * * * *